US007017074B2

(12) United States Patent
Okin

(10) Patent No.: US 7,017,074 B2
(45) Date of Patent: Mar. 21, 2006

(54) SYSTEM ARCHITECTURE PROVIDING REDUNDANT COMPONENTS TO IMPROVE DIE YIELDS AND SYSTEM RELIABILITY

(75) Inventor: Kenneth Okin, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 491 days.

(21) Appl. No.: 10/099,716

(22) Filed: Mar. 12, 2002

(65) Prior Publication Data

US 2003/0177425 A1 Sep. 18, 2003

(51) Int. Cl.
*G06F 11/00* (2006.01)

(52) U.S. Cl. .............................. 714/11; 712/11; 714/13; 714/31

(58) Field of Classification Search .................. 714/11, 714/13, 31; 712/11
See application file for complete search history.

(56) References Cited

U.S. PATENT DOCUMENTS

| | | | | |
|---|---|---|---|---|
| 3,623,011 A | * | 11/1971 | Baynard et al. ............... 714/25 |
| 4,802,164 A | * | 1/1989 | Fukuoka et al. ............... 714/44 |
| 4,891,810 A | * | 1/1990 | de Corlieu et al. ........... 714/11 |
| 5,136,498 A | * | 8/1992 | McLaughlin et al. ......... 700/79 |
| 5,285,381 A | * | 2/1994 | Iskarous et al. ............... 700/82 |
| 5,295,258 A | | 3/1994 | Jewett et al. .................. 714/12 |
| 5,504,670 A | * | 4/1996 | Barth et al. .................... 700/5 |
| 5,931,959 A | * | 8/1999 | Kwiat ............................ 714/48 |
| 5,951,683 A | | 9/1999 | Yuuki et al. .................... 713/1 |
| 5,953,314 A | * | 9/1999 | Ganmukhi et al. ......... 370/220 |
| 6,018,812 A | | 1/2000 | Deyst, Jr. et al. ............ 714/724 |
| 6,067,633 A | * | 5/2000 | Robbins et al. ............... 714/11 |
| 6,101,138 A | | 8/2000 | Shiah et al. ................. 365/200 |
| 6,246,616 B1 | | 6/2001 | Nagai et al. ................. 365/200 |
| 6,674,821 B1 | * | 1/2004 | Mejyr ......................... 375/354 |
| 6,694,395 B1 | * | 2/2004 | Tanaka ........................ 710/100 |

* cited by examiner

*Primary Examiner*—Scott Baderman
*Assistant Examiner*—Paul Contino
(74) *Attorney, Agent, or Firm*—Meyertons Hood Kivlin Kowert & Goetzel, P.C.; B. Noël Kivlin

(57) ABSTRACT

A semiconductor device, such as a multiprocessor chip for a computer system, includes a total number of on-board components which is greater than the number of that component required by the system. The chip may be provided with multiple I/O controllers, e.g. more than one controller per I/O interface, and the I/O controllers can act as backups to one another, with failover logic controlling the backup process. In addition, the number of processors formed on the chip may be greater than the number required by the system, allowing multiple levels of redundancy and greater successful manufacturing yields.

21 Claims, 4 Drawing Sheets

SYSTEM ARCHITECTURE PROVIDING REDUNDANT COMPONENTS TO IMPROVE DIE YIELDS AND SYSTEM RELIABILITY

BACKGROUND OF THE INVENTION

This invention relates to a computer system architecture to improve processor die yields and system reliability. In particular, it relates to a system architecture providing redundant processors on a single chip, coupled via I/O (input/output) controllers to I/O pin interfaces, with redundant I/O controllers also being provided relative to the number of I/O interfaces.

In chip designs in use today, multiple processors may be formed on a single die, along with other circuitry, such as on-board cache, I/O logic and connectors at the edge of the chip, and I/O controllers controlling the flow of data between the I/O interfaces and the processors. For instance, in a typical system in use today as shown in FIG. 1, a number of processors (such as the four processors 10–40 shown) are formed on a die, along with crossbar circuitry 60 coupling the processors to input-output controllers (IOCs) 70–90. The IOCs communicate with I/O interfaces 160, with one IOC coupled to each pair of I/O interfaces, as shown.

The I/O interfaces 100–150 are connected to pins 160 along an edge 170 of chip 10, for coupling to a circuit board, such as the motherboard of a workstation or server.

In such a system, failure of any one of the processors will make the chip useless, since in general the system in which the chip is used will depend upon having all four (in this example) processors available.

Likewise, if a given I/O controller on the chip fails, then a path from a processor to an I/O interface is made unavailable, and the chip becomes worthless. Thus, each processor and each IOC forms part of a critical functional unit, which requires replacement of the chip upon failure.

In semiconductor chip manufacture, a certain nonzero failure rate is inevitable, and regular memory arrays are already routinely repaired. As circuit design becomes more and more complex, and electronic features are shrunk further, the probability of faults in the processed wafers increases, and at the same time the price of failure for a given wafer or die also increases.

It is therefore becoming more important that architecture features be developed that deal with these factors, and in particular that minimize the high penalties associated with the failure of circuit components on a die, namely the discard of the die and associated computational and economic loss. For example, current processors are vulnerable to die loss if a defect occurs in 70–80% of the die area, since the reparable memory arrays take up the rest of the die.

SUMMARY OF THE INVENTION

The processor-based architecture of the present invention uses a redundant-processor design, where multiple processors on a die are connected to a crossbar circuit. The crossbar circuit is itself connected to a number of input-output controllers (IOCs), which are in turn connected to I/O interface logic and pins, typically positioned at the edge of the chip to provide communication between the processors and a system motherboard or other circuitry.

The number of processors on the chip is, in a preferred embodiment, greater than the number of processors required by the system into which the chip is to be installed. Circuitry and software control are provided to determine and keep track of the number of properly functioning processors, both at the time of manufacture and in the operating environment.

If a processor fails, a saved state for that processor is transferred to a functional processor in a failover process, and the system continues to operate without the need to replace the chip or motherboard.

Similarly, redundant IOCs are provided between the crossbar circuitry and the I/O interfaces, such that failure of one or more IOCs can be tolerated without interfering with the operation of the system.

These design features allow both greater yield at time of manufacture and greater reliability of multiprocessor circuitry in operation.

DESCRIPTION OF THE PREFERRED EMBODIMENTS

Figure 2:
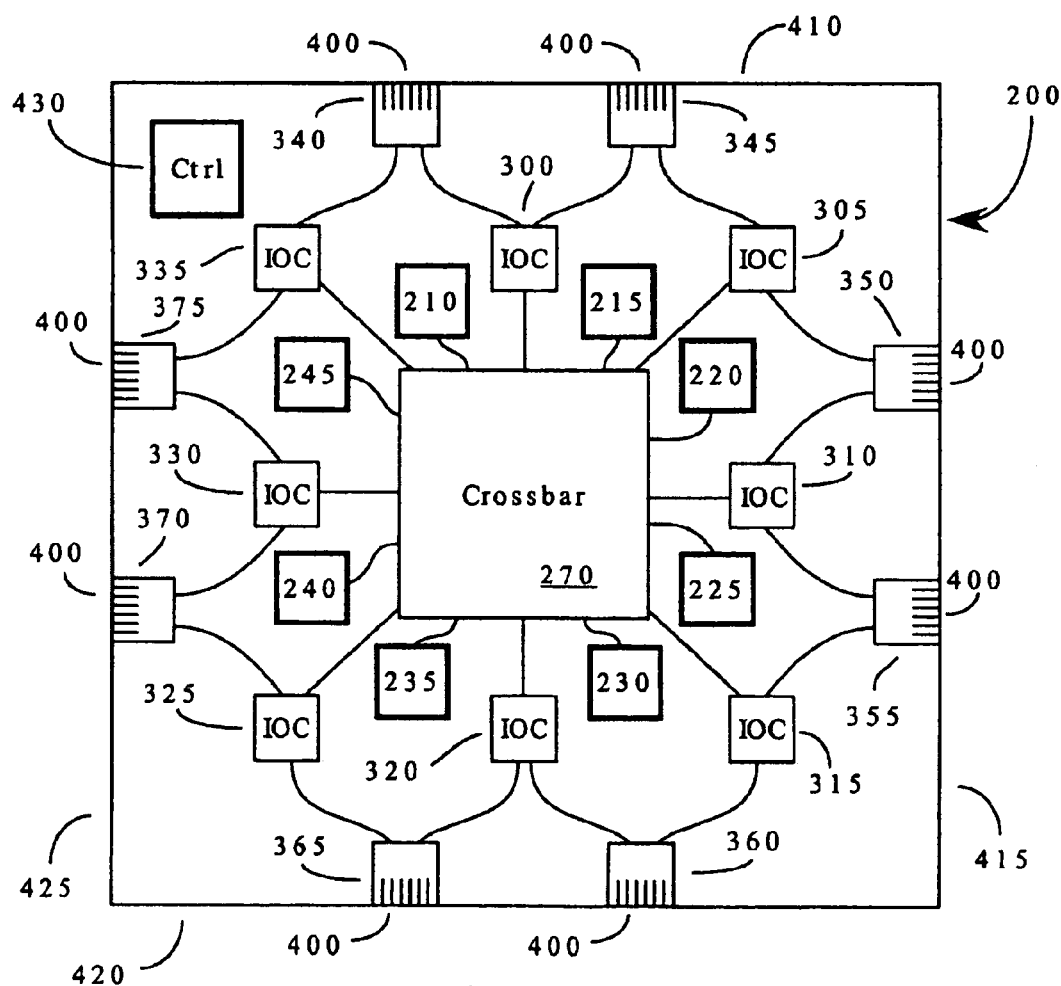
FIG. 2 is a block diagram of a new system architecture according to one embodiment of the present invention.

A multiprocessor system chip 200 according to the present invention is shown in FIG. 2. In this embodiment, eight processors 210–245 are formed on the die, and hence on the installed chip, and are connected to a crossbar circuit 270. Multiple I/O controllers (IOCs) 300–335 are likewise connected to the crossbar circuit 270, and these IOCs communicate with I/O interfaces 340–375. The I/O interfaces connect to the system motherboard or another circuit board via pins 400 along edges 410–425 of the chip 200.

Figure 1:
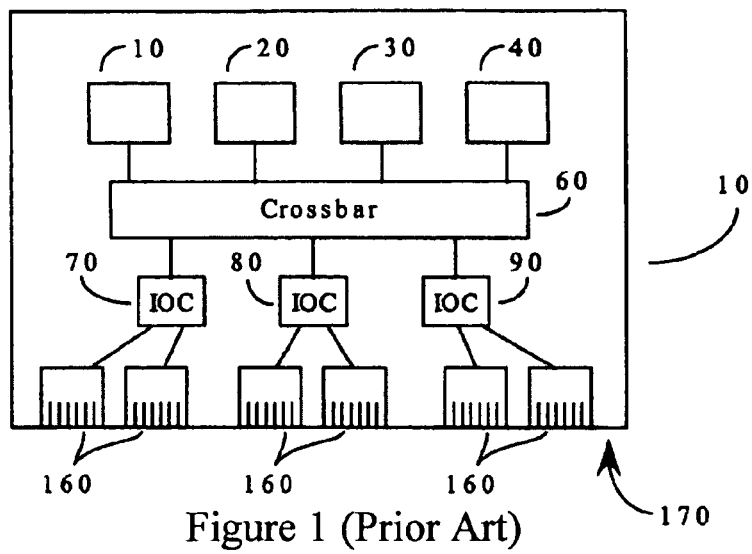
FIG. 1 is a block diagram of an architecture according to prior systems.

Several features appear in the architecture of FIG. 2 that are different from a prior system such as shown in FIG. 1. First, the chip of FIG. 2 will in general be suitable for use in a system requiring fewer than the total number of processors actually provided on the chip 200. For example, chip 200 may be designed for installation into a system using four or six processors, not the eight total processors actually formed on the chip.

Thus, the chip 200 includes a control circuit 430, which may incorporate hardware, firmware and/or software control functionality, which governs the actual operation of the processors 210–245 (and is coupled to the processors in a conventional manner). At the time of chip manufacture, in general each chip will be tested to determine whether all of the processors on board are functional. If all eight processors are operational, then six of the eight (in this example) will be selected in a predetermined manner for actual operation in the system for which the chip is designed. For example, the chips may be identified by identification codes, and the lowest-numbered functional chips are selected for default usage in the system.

For the purposes of this description, "operational" or "functional" means that the component in question has been successfully formed on the chip, so that it is capable of operating essentially in the manner for which it was designed. This is determined by conventional testing methods.

Figures 4, 5:
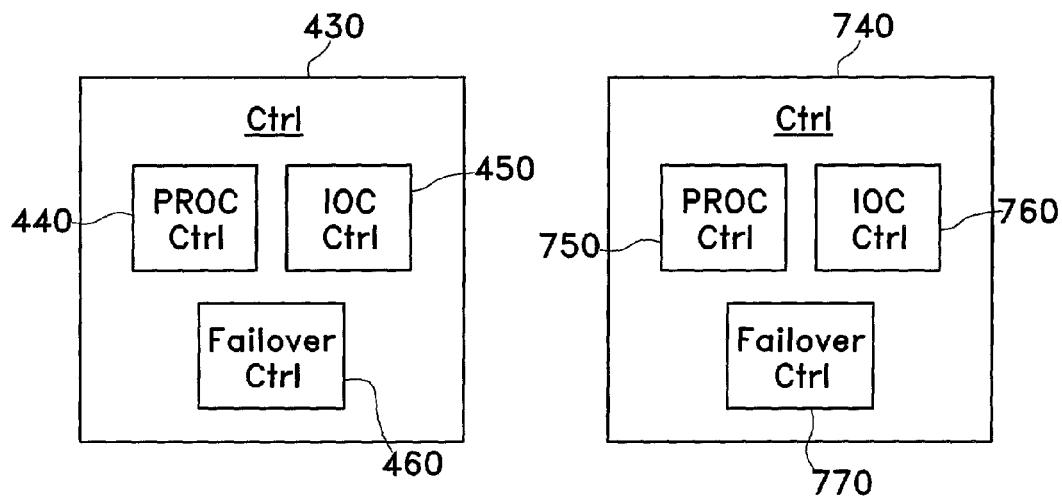
FIG. 4 is a block diagram showing details of the control logic for the system shown in FIG. 2.
FIG. 5 is a block diagram showing details of the control logic for the system shown in FIG. 3.

If one of the eight processors, e.g. processor 230, is found by the manufacturing diagnostic steps as functioning incorrectly, that processor is permanently removed from operation, under control of the circuit 430, and in particular under control of a processor control circuit 440 shown in FIG. 4. This circuit 440 may include, for example, an EEPROM that is programmed with the appropriate information, namely the control software and, in this example, the information that processor 230 is faulty and should not be used. Instead of an EEPROM, some other storage unit (including some other type of PROM, ROM, etc.) could be used.

In this case, processors 210–225 and 235–240 may be the selected default processors, and processor 245, while in principle operational, is not actually used by the system because six processors are already available.

However, it may be that during the life of the chip 420, one of the processors 210–225 or 235–240 fails. Processor control circuit 440 includes logic for detecting this, and when the failure occurs circuit 440 removes the faulty processor from operation, preventing further communication with the IOCs or I/O interfaces. The failover logic (or indeed, any of the control circuits referred to herein) may include electronic or semiconductor elements (e.g. processors, logic, ROMs, etc.), firmware or software, or some combination of these as appropriate for the application.

Circuit 440 at this time brings processor 245 into operation, substituting for the failed processor. Conventional failover techniques may be used, such as maintaining states of the operational processors and transferring a saved state to the newly operational processor upon failure of one of the previously used processors.

While processors 210–225 and 235–240 are operating, circuit 440 may control processor 245 in various ways. One possibility is to prevent driving the clock of processor 245, thus saving energy and minimizing heat generation while the processor 245 is not needed.

In another embodiment, processor 245 may be used for real-time diagnostics and/or state-saving computation relative to the operational processors. Alternatively, either or both of these functions may be carried out by the control circuit 440, with the trade-off being that a greater amount of processing power (and circuitry) will in general be needed for such enhanced failover functionality of the circuit 440.

An advantage of having an otherwise unused processor (such as 245) govern the failover functions is not only that it can simplify and reduce the expense of the circuit 440, but also that, with appropriate distributed software control, any of the unused processors can be used for such operations. Thus, there is less likelihood of failure of the chip, which could result if dedicated control circuitry 440 is used for the important failure detection and recovery operations. Thus, this critical path for high availability can be made more robust by using the redundancy inherent in the architecture of the invention.

In general, for a system designed to use x processors on a given chip, there will be some number $y \geq x$ of operational processors provided on the chip. The die will be designed to form z processors, which will in general be greater than x. Of the z processors, some number $y \leq z$ will be diagnosed as properly operational. (In the above example, x=6, y=7 and z=8, and thus $x \leq y \leq z$.)

When a chip is cut from a wafer and tested, the value for y (i.e., the number of operational processors) is determined. This information is provided to the customer, and a variety of chips can be made available, with their respective value relating to the number of backup processors available on board (between zero and z–x). There is a cost associated with providing very many backup processors, but in critical settings a high degree of redundancy may be desired.

For instance, in the above example, there may be at least twice as many processors on board as actually needed for the system, i.e. $z \geq 2x$ (or it could be required that $y \geq 2x$). An advantage of such a system is that each backup processor may carry out operations in tandem with an associated operational processor, such that a fully redundant highly available system is implemented on a single chip. Additional processors beyond the second full set may be provided as desired, e.g. for further backup functionality (in case of a double failure, i.e. the failure of one of the backup processors) or to provide failover control.

In the embodiment of FIG. 2, if x=4 then z=2x, and such a fully redundant highly available system is presented (for a system requiring a three-processor chip), with appropriate implementation of hardware and software control. For critical settings, the multiplier can be higher; e.g. the designer could choose z=3x or in general z=Mx (or y=Mx), where M can be any number greater than or equal to one. M need not be an integer, as long as the product Mx is an integer or is rounded to an integer (i.e., the number of processors or other elements to be fabricated is a whole number).

In FIG. 2, it will be noted that the number of IOCs 300–335 is equal to the number of I/O interfaces 340–375. In this case, there are eight IOCs and eight I/O interfaces, with each IOC being connected to two I/O interfaces, and likewise each I/O interface being connected to two IOCs. Thus, a certain amount of redundancy is provided for each I/O channel off the chip, via the pins 400.

The interconnections between the IOCs and the I/O interfaces, as well as the circuitry between the processors and the IOCS, can be accomplished in a variety of manners, using crossbar designs, conventional multiplexing, or other variable configuration circuitry, e.g. circuit-switched or packet-switched designs or FPGA (field-programmable gate array) elements.

Using this arrangement, if an IOC—for example, IOC 305—fails, then the control circuit 430, which is coupled to the crossbar 270 and the IOCs, detects this. In particular, control circuit 430 is provided with IOC control logic and programming 450 (see FIG. 4), which monitors the behavior of all of the IOCs 340–375 and controls their connections (e.g. the multiplexing circuitry) to the crossbar 270 and the I/O interfaces 340–375. If IOC 305 fails, then control circuit 450 removes it from the active IOCs in a conventional manner, e.g. by preventing any data from passing to or from the IOC 305.

In this case, IOC 300 must thereafter handle all input and output through I/O interface 345, and IOC 310 handles all I/O through I/O interface 350. IOCs 310 and 315 still cooperate to ensure I/O through I/O interface 355, i.e. each can still act as a backup to the other for interface 355, although IOC 310 has sole responsibility for interface 350. Similarly, IOCs 300 and 335 continue to act as backups for one another for I/O interface 340, though IOC 300 has sole responsibility for interface 345.

If IOC 315 were also to fail, then control circuit would provide IOC 310 with connections and responsibility for both interfaces 350 and 355, while IOC 320 would take over all I/O tasks for interface 360.

In principle, an arbitrarily large amount of redundancy can be provided for the IOCs, by connecting them to a larger number of interfaces. The arrangement in FIG. 2 is easier to manufacture than one with a larger number of interconnections, with a resulting increase in reliability and cost savings due both to its relative simplicity and the higher expectable yield of functional units during fabrication.

Figure 3:
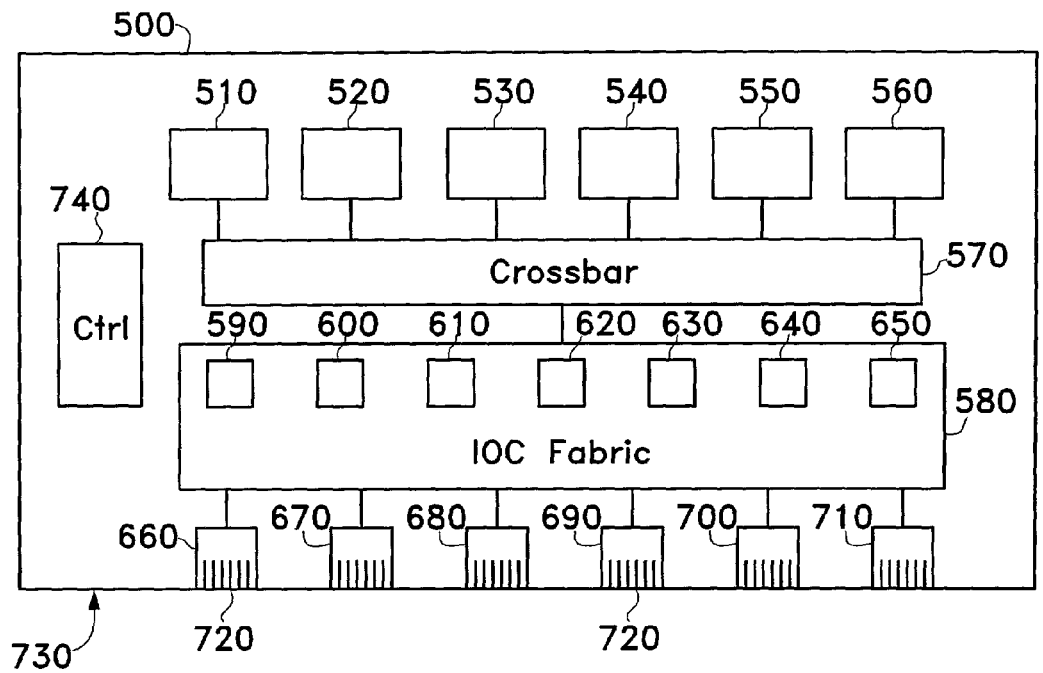
FIG. 3 is a block diagram of another embodiment of the new system architecture of the present invention.

FIG. 3 shows an alternative embodiment of a chip 500 of the invention, again provided with multiple processors 510–560 connected by a crossbar 570 to IOCs 590–650. As in the embodiment of FIG. 2, the IOCs control the transfer of data to and from I/O interfaces 660–710, which communicate off-chip via pins 720 along edge 730 of the chip 500.

Control of the interconnections, failover, etc. of the chip 500 is governed by control circuit 740, which, as shown in FIG. 5, includes elements such as processor control 750, IOC control 760 and failover control 770. Controls 750–770 operate in a manner similar to that of controls 440–460 shown in FIG. 4, with additional functionality provided as needed for the alternative embodiment of FIG. 3.

This alternative embodiment includes a switching "fabric" 580, which ideally includes one possible circuit path for each IOC-I/O interface combination. Thus, in the example design shown in FIG. 3, with seven IOCs 590–650 and six I/O interfaces 660–710, there are forty-two paths by which the IOCs can be connected to the I/O interfaces.

This can be achieved in a variety of manners, including any combination of those mentioned above, such as multiplexing or using FPGAs. If an FPGA circuit is used, then it is controlled by the IOC control 740 in a known manner for FPGAs to make the appropriate IOC-I/O interface connections.

Using a connection fabric 580 allows each IOC to act as a backup to all the other IOCs, rather than simply backing up in pairs (or other numbers of IOCs), as in the embodiment of FIG. 2. By providing as many IOCs as desired, depending upon the criticality of the application weighed against the expense of additional circuitry, an arbitrarily large amount of redundancy and reliability can be provided for the chip 500. The same is true of the processors 510; that is, the crossbar 570 can also be replaced by an interconnect fabric like the IOC fabric 580, with the result that all of the processors back one another up.

This arrangement provides two levels of redundancy: one at the processor level and one at the IOC level. Depending upon the architecture of the chip, there may be other levels or on-board functions for which it would be helpful to have a connection fabric or variable interconnect design as described above. The architecture of the invention is not confined to IOCs and processors, but is also applicable to such other functions.

Figure 6:
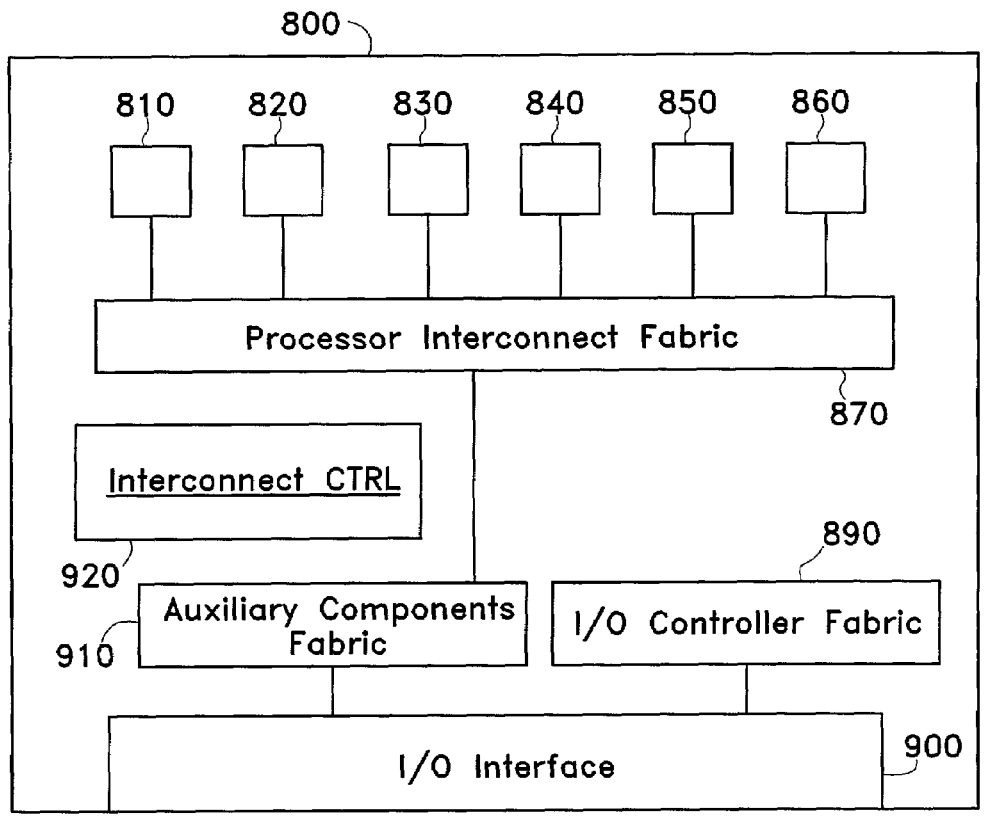
FIG. 6 is a block diagram showing yet another embodiment of the new system architecture of the invention.

A generalized embodiment of the architecture of the invention appears in FIG. 6, which shows a chip 800 with six processors 810–860 connected to a processor interconnect fabric 870, as described above. The fabric 870 connects via an I/O controller fabric 890 to the I/O interfaces 900, in the manner described with respect to FIG. 3.

In FIG. 6, the IOC fabric block 890 should be understood to include the I/O controllers; that is, they are not separately represented as in FIGS. 1 and 3. Likewise, the I/O interfaces 900 are not individually shown, but should be understood to include the individual I/O interfaces and pins as described for FIGS. 1 and 3.

FIG. 6 also shows a separate auxiliary components fabric 910, which includes circuit, processor or other electronic elements, including software or firmware as needed, for any other function that the chip architect may decide to include on-board. For instance, it may be deemed desirable to include redundant circuitry for the on-board cache, which can be implemented in a manner like the redundant processor and IOC implementations described above.

Interconnect control circuit 920 in FIG. 6 operates in a manner similar to control circuits 430 and 740 shown FIGS. 2–5, to control the connectivity, failover, etc. of the respective components on the chip 800.

A further extension of the auxiliary components fabric could, for example, implement a COMA (cache-only memory architecture) or NUMA (non-uniform memory architecture) design on-board the processor chip, and the fabric 910 can provide access to all of the processors 810–860 for the caches, with as much redundancy as desired to provide high reliability.

In general, the features of the present invention can be applied to any on-chip elements, in particular those that use a valuable resource such as a processor or a controller. The redundancy provided for such resources both ensures high reliability for the chip as a whole in operation and the ability to tolerate chip defects at time of manufacture.

Figure 7:
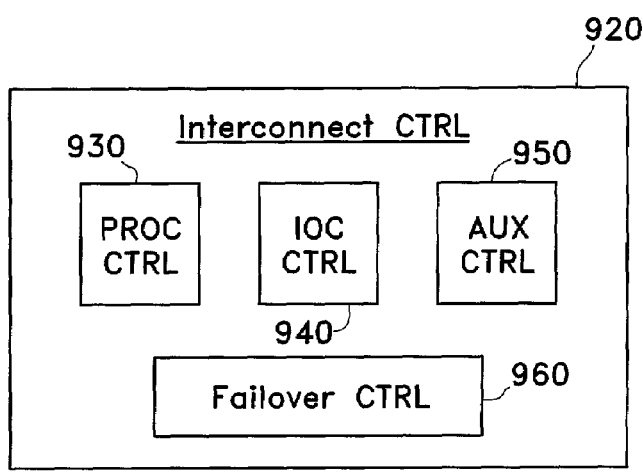
FIG. 7 is a block diagram showing details of the control logic for the system shown in FIG. 6.

The various control circuits (430, 740, 920, with the individual control modules 440–460, 750–770 and 930–960, respectively) shown in FIGS. 4, 5 and 7 can be configured to control their respectively associated chip elements in a variety of manners. For instance, as indicated above any of them could be programmed or otherwise designed to turn their associated components off or to some extent power them down (i.e., place them in a "wait" or "sleep" state) whenever the components are not in use, in order to save power and minimize heat generation. Generally, a powered-down, non-clocked, or partially powered-down situation may be referred to as a "wait" state for a given component, while a "backup" mode may be considered either a wait state, a fully redundant operational state, or in general any mode in which the backup component is not providing the primary functionality to the system.

Alternatively, some or all of the components may be powered and clocked in a fully operational backup mode, while others are placed in a wait state, thus both providing the high-availability features (e.g. tandem operation, state preservation, etc.) described above and ensuring a quick failover if that does occur. Finally, all of the redundant components could be kept in active backup mode for the quickest failover possible.

One variation on this is, in a system with triple redundancy of a component (e.g. the processors), to keep the second tier of redundancy fully operational in tandem, while holding the third tier in a wait state. If individual ones of the second-tier components fail, their respective third-tier backups can be brought into operation, while the remaining third-tier components are kept in the wait state.

Components in the wait state that are brought into full operation are provided with state information of the system at that time, in a manner known in the art.

It will be appreciated that, at the time of manufacture, if z components (processors, I/O controllers, or other components) are formed on a chip, but only x components are required by the chip or the system, then if at least x properly functional components are successfully fabricated, that chip can be deemed to have passed quality control. This potentially greatly increases the yield of the fabrication process, since any number of the components beyond x that function are simply a bonus. It may be, as discussed above, that certain settings will require more than x processors, e.g. to provide a highly available design, in which case the principle is the same—to fabricate on the chip a number of components greater than the required number, using any functional excess as desired but thereby providing manufacturing leeway in case some or all of the excess components are not properly functional.

Figure 8:
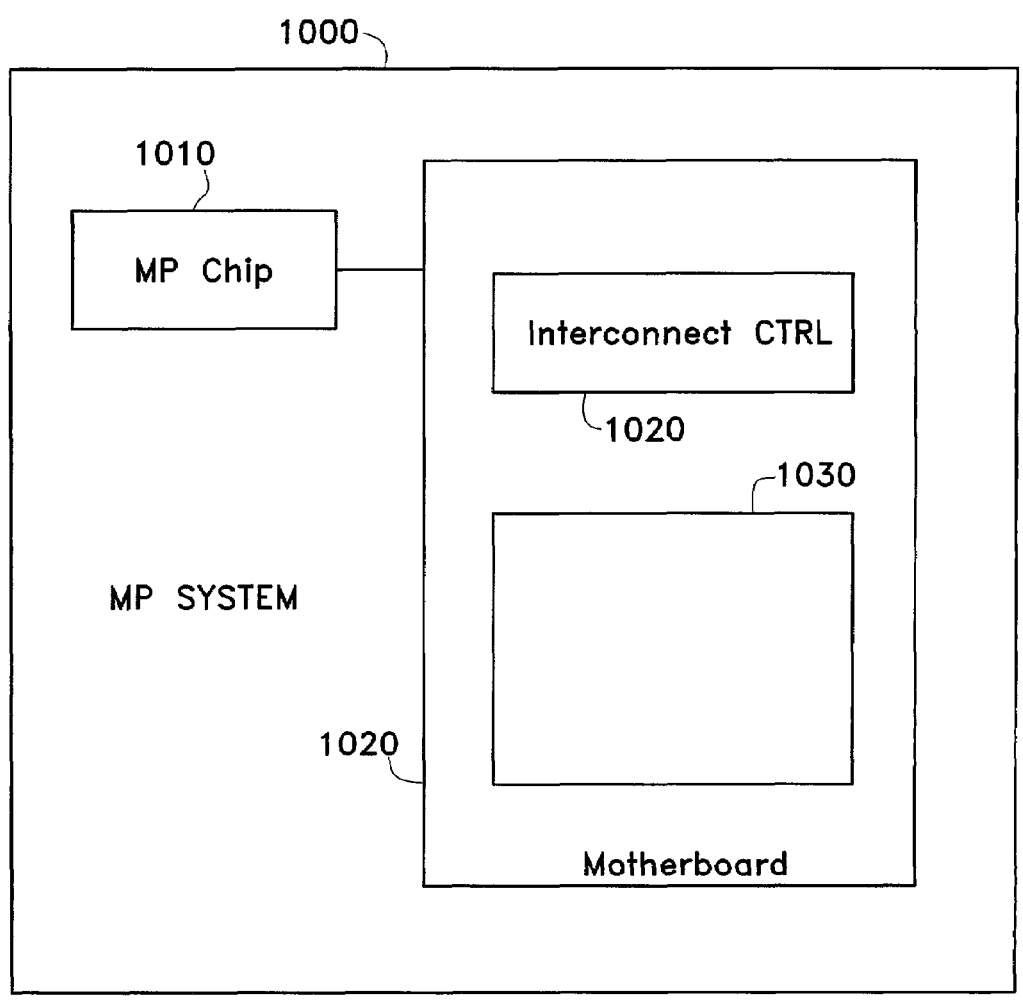
FIG. 8 is a block diagram of a multiprocessor system suitable for use in connection with the present invention.

FIG. 8 shows the architecture for a multiprocessor system 1000 using a multiprocessor chip 1010 (or a chip providing other multiple components, including processors, I/O controllers, and/or other components as described above with respect to FIG. 6). The chip 1010 may thus be essentially like any of the chips 200, 500 or 800 described above.

The system 1000 includes a motherboard with conventional circuitry 1030 (memory, I/O, etc.), and in addition may include interconnect control logic 1020 into which any or all of the features of the interconnect control 920 (or the controls 430 or 740) may be incorporated. Thus, if the system architect wishes to provide failover functionality for the chip's components at the system level, this is possible, and either the on-chip control logic, or the control logic at the system level, or both, may be used.

Thus any one or more of the component verification, state maintenance, failover protocols, etc. may all be provided at the system level, if desired, so long as the system is provided with sufficient information to identify, test for functionality and control the operation of the individual components on board the chip 1010. To this, end, each of the desired components may be provided with a unique ID for use in communicating with the system-level logic 1020 for such verification and operational control.

Other embodiments incorporating the inventive features are possible.

What is claimed is:

1. A semiconductor device for use in a computing system, the semiconductor device comprising:
   a plurality of processors formed on the semiconductor device;
   a plurality of input/output (I/O) controllers formed on the semiconductor device and coupled to the plurality of processors such that each of the plurality of processors is coupled to each of the plurality of I/O controllers; and
   a plurality of I/O interfaces formed on the semiconductor device and coupled to convey the data between the plurality of I/O controllers and the computing system;
   wherein the plurality of I/O controllers are arranged to form a switching fabric including a plurality of communication channels configured to convey data between any of the processors and any of the (I/O) interfaces;
   wherein at least a portion of the processors and at least a portion of the I/O controllers are redundant.

2. The semiconductor device of claim 1, further comprising a controller configured to detect a failure of any of the plurality of processors and any of the plurality of I/O controllers.

3. The semiconductor device of claim 2, wherein the controller is further configured to remove from service a given processor in response to detecting a failure in the given processor.

4. The semiconductor device of claim 2, wherein in response to detecting a failure of a given processor, the controller is further configured to cause a given redundant processor to perform operations associated with a failed processor.

5. The semiconductor device of claim 2, wherein the controller is further configured to cause one or more of the redundant processors to be disabled and placed in a wait state.

6. The semiconductor device of claim 2, wherein the controller is further configured to cause one or more of the redundant processors to be enabled and placed in a wait state.

7. The semiconductor device of claim 2, wherein the controller is further configured to cause one or more of the redundant processors to be disabled by disabling a clock signal used to clock the one or more of the redundant processors.

8. The semiconductor device of claim 2, wherein the controller is further configured to cause one or more of the redundant processors to run real-time diagnostics for the computing system.

9. The semiconductor device of claim 2, wherein the controller is further configured to cause one or more of the redundant processors to manage failover functions of the computing system.

10. The semiconductor device of claim 1, further comprising a crossbar configured to interconnect each of the plurality of processors to each of the plurality of I/O controllers.

11. The semiconductor device of claim 1, wherein the switching fabric is configured to interconnect each I/O controller of the plurality of I/O controllers to at least two I/O interfaces of the plurality of I/O interfaces.

12. The semiconductor device of claim 1, wherein the switching fabric is configured to interconnect each I/O controller to each I/O interface of the plurality of I/O interfaces.

13. A method comprising:
   providing a plurality of processors on a semiconductor device;
   providing a plurality of input/output (I/O) controllers on the semiconductor device;
   interconnecting each of the plurality of processors to each of the plurality of I/O controllers; and
   providing a plurality of I/O interfaces on the semiconductor device for interconnecting the plurality of I/O controllers and a computing system;
   providing a switching fabric by arranging the plurality of I/O controllers and including a plurality of communication channels configured to convey data between any of the processors and any of the (I/O) interfaces;
   wherein at least a portion of the processors and at least a portion of the I/O controllers are redundant.

14. The method of claim 13, further comprising detecting a failure of any of the plurality of processors and any of the plurality of I/O controllers.

15. The method of claim 14, removing from service a given processor in response to detecting a failure in the given processor.

16. The method of claim 13, wherein in response to detecting a failure of a given processor, causing a given redundant processor to perform operations associated with the failed processor.

17. The method of claim 13, further comprising causing one or more of the redundant processors to be disabled and placed in a wait state.

18. The method of claim 13, further comprising causing one or more of the redundant processors to be enabled and placed in a wait state.

19. The method of claim 13, further comprising causing one or more of the redundant processors to be disabled by disabling a clock signal used to clock the one or more of the redundant processors.

20. The method of claim 13, further comprising causing one or more of the redundant processors to run real-time diagnostics for the computing system.

21. The method of claim 13, further comprising causing one or more of the redundant processors to manage failover functions of the computing system.

* * * * *